United States Patent [19]

Charest et al.

[11] Patent Number: 5,328,133
[45] Date of Patent: Jul. 12, 1994

[54] SYSTEM FOR CARRYING EQUIPMENT AND/OR A WORKMAN TO A HIGH VOLTAGE LINE OR INSTALLATIONS

[76] Inventors: Marc Charest, 7515, rue Marisa, Brossard, P. Québec, Canada, J4Y 1J8; Sylvain Allard, 2828 Polo Drive, St-Lazarre, P. Québec, Canada, J0P 1V0

[21] Appl. No.: 99,691

[22] Filed: Jul. 30, 1993

[51] Int. Cl.$^5$ .............................................. B64D 9/00
[52] U.S. Cl. ............................. 244/118.1; 244/137.1; 244/137.4; 182/142; 182/150
[58] Field of Search ............... 244/118.1, 137.1, 137.4, 244/118.5; 182/150, 142

[56] References Cited

U.S. PATENT DOCUMENTS

| | | | |
|---|---|---|---|
| 4,422,528 | 12/1983 | Patterson | 182/150 |
| 4,478,312 | 10/1984 | Kurtgis | 182/142 |
| 4,609,168 | 9/1986 | Dean et al. | 244/137.4 |
| 4,673,059 | 6/1987 | Kurtgis | 182/142 |
| 5,072,895 | 12/1991 | Camus | 244/118.1 |

FOREIGN PATENT DOCUMENTS

| | | |
|---|---|---|
| 1248930 | 1/1989 | Canada . |
| 1294264 | 1/1992 | Canada . |
| 2055639 | 5/1992 | Canada .............................. 182/150 |
| 1306230 | 8/1992 | Canada . |

Primary Examiner—Michael S. Huppert
Assistant Examiner—Anne E. Bidwell

[57] ABSTRACT

An electrically insulated support or the like is mounted on a helicopter to extend from both sides of the helicopter. A bucket for equipment, material and/or a worker is provided, which can be engaged or disengaged at the end of the support. To carry out operation on a high voltage line or installations, the bucket with its equipment, material and/or worker is hooked at one end of the support and is carried by the helicopter to a location of the high voltage line or installations where an operation has to be carried out. The operation is done while the helicopter holds the bucket or most preferably, the bucket which is provided with suspension wheels is mounted on the line conductors or installations and the helicopter is moved away while the operation is being carried out.

15 Claims, 3 Drawing Sheets

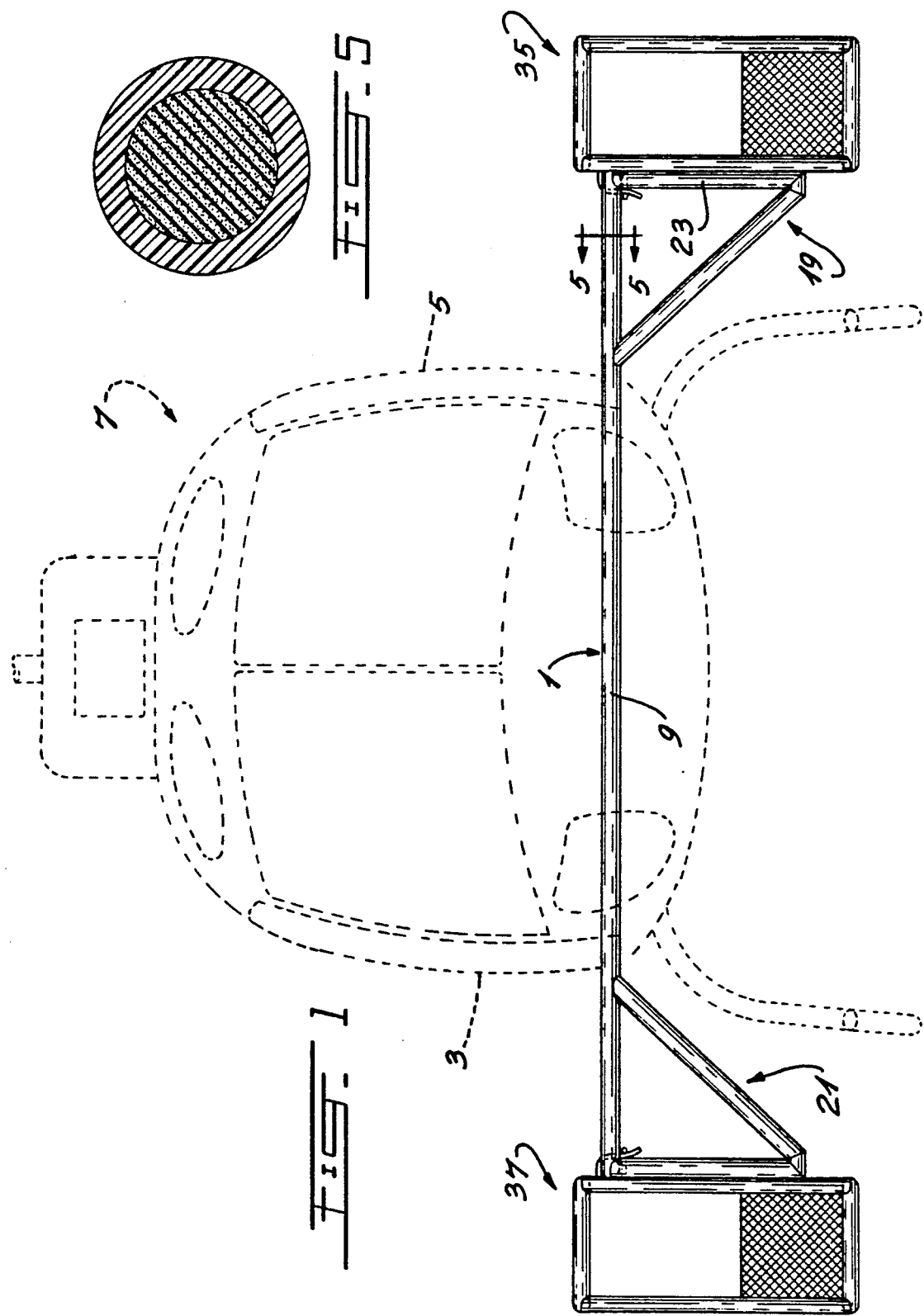

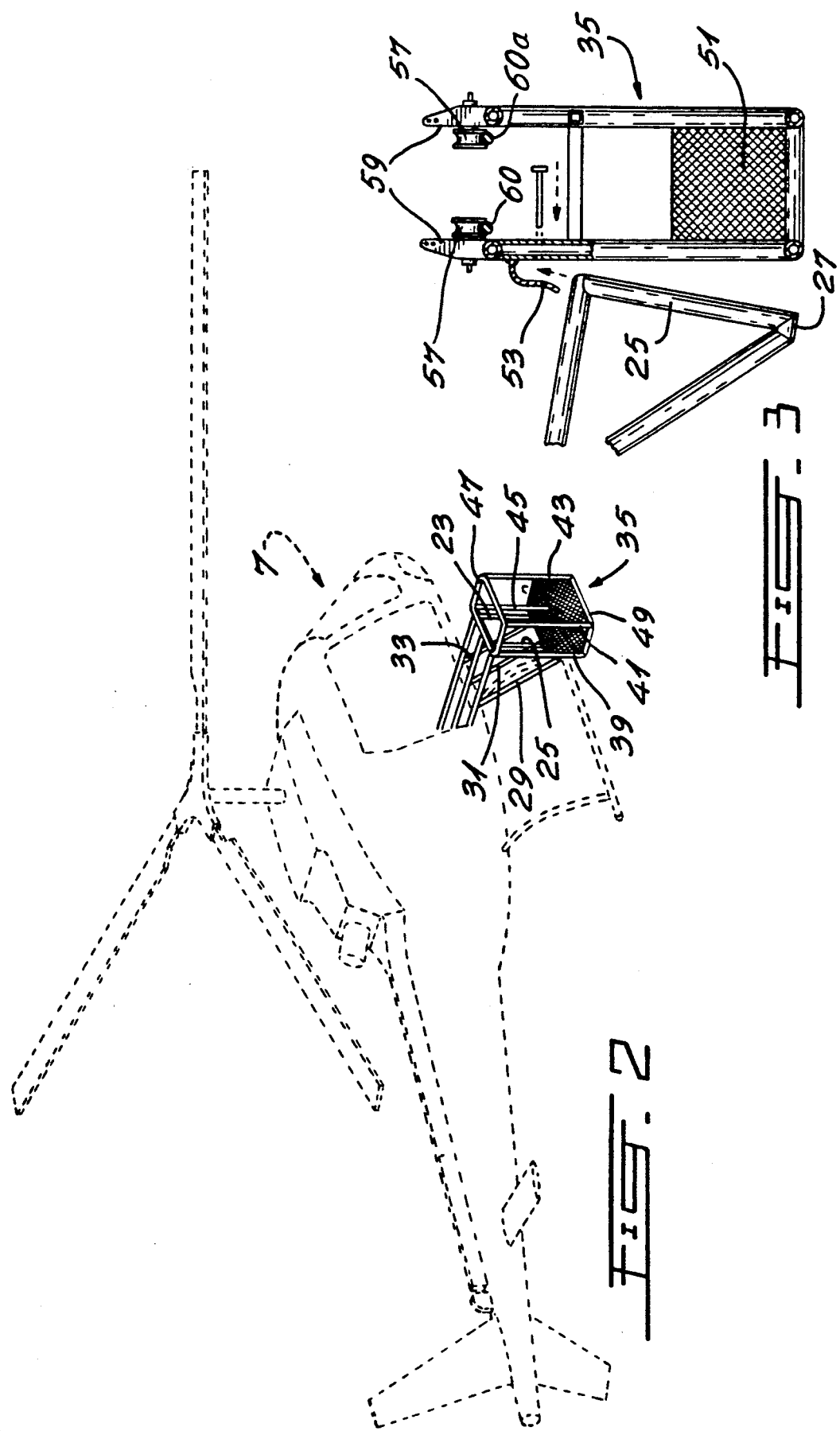

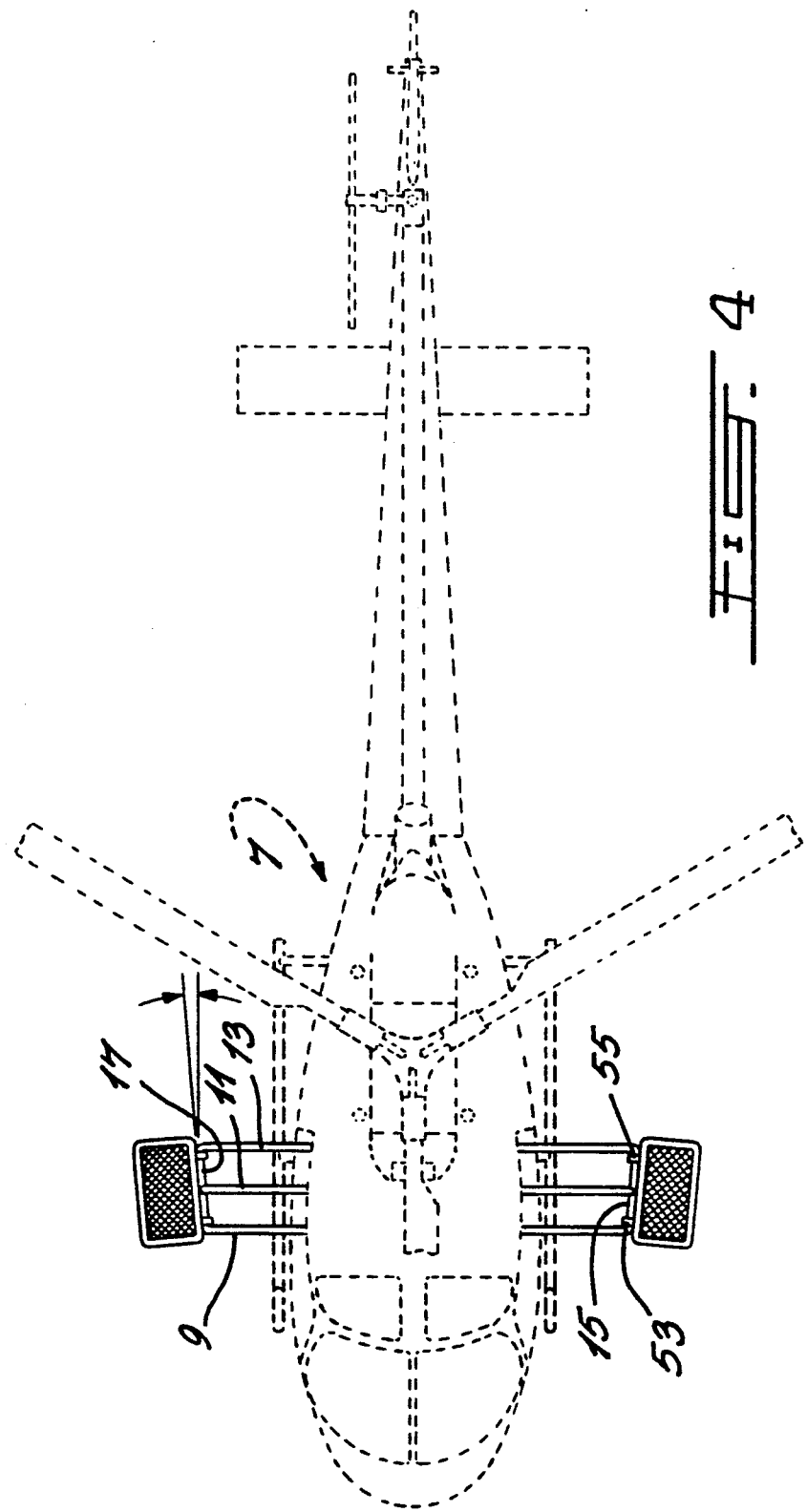

SYSTEM FOR CARRYING EQUIPMENT AND/OR A WORKMAN TO A HIGH VOLTAGE LINE OR INSTALLATIONS

BACKGROUND OF INVENTION (1.) Field of the Invention

This invention relates to a system for carrying equipment, material and/or a worker onto a high voltage line transmission by means of an helicopter. More particularly, the present invention is concerned with a device which enables a worker to repair, replace or install material or equipment on energized or de-energized lines or installations.

2.) Description of Prior Art

Whenever a problem arises on an electrical power line, or damages are located, it is necessary to carry out repairs. One way to do this is to switch off the electrical power or to put the line or installations out of service. In many instances, this is not feasible because of the necessity to maintain service. It is costly and most impractical. It is also possible to work using insulated tools and equipment; however if the line or installations are the least elevated this is completely impossible. Another possibility is to put the worker in a conductive suit which acts as a Faraday cage and to place the worker in a bucket which is held at the end of a boom or the like and which is completely insulated from the ground. In today's technology the terrains on which high voltage lines are often built have difficult access and are rather high, which renders the repair totally impractical.

Another way to intervene on a power line is disclosed in Canadian Patent Nos. 1,248,930; 1,294,264 and 1,306,230 inventor Scott H. Yenzer, as well as U.S. Pat. No. 5,072,895 inventor Mark Camus. This design makes use of a working platform which is mounted on the landing assemblies of a helicopter. The worker is in a conductive suit. The platform and the helicopter must be electrically connected so that, along with the conductive suit, they may all be at the same potential as the high voltage line. For a repair to be carried out, the worker must first establish contact or provide a bonding with the line, and the helicopter must hover close to the power line or installations during the entire operation. This of course produces great stress on the pilot and the worker and the fact of placing the whole assembly at the same potential as the power line could adversely affect the helicopter systems.

It is therefore an object of the invention to provide a system which would avoid most of the disadvantages of the prior art.

It is another object of the present invention to provide a system which does not require to electrically connect the helicopter to the support of the bucket and its contents.

It is another object of the present invention to enable a helicopter to selectively engage or disengage a bucket from an insulating supporting structure attached to the helicopter whereby the bucket may be placed on or transferred to a high voltage line conductors or any installations.

SUMMARY OF INVENTION

In accordance with the invention, there is provided a system for carrying equipment, material and/or a worker, and placing them on a high voltage line or installations by means of a helicopter, to effect operations thereon, the system comprising:

elongated support means made of electrically insulating material; the elongated support means extending from both sides of the helicopter, at least one bucket for the equipment, material and/or worker, means for removably attaching the bucket on at least one end of the support means, and means enabling the bucket to be maintained in substantially vertical position while attached at one end of the support means.

In accordance with a preferred embodiment, the support means consists of a plurality of elongated beams, fixed together by means of a plurality of cross members.

Preferably, the beams and cross members are made of synthetic material such as reinforced glass fibers.

In accordance with a preferred embodiment, the system comprises a bucket supporting frame which is substantially perpendicularly mounted at one or both ends of the beams.

In accordance with another preferred embodiment, the bucket supporting frame comprises an end cross member fixedly mounted at the outer ends of the beams, downward struts perpendicularly disposed at the ends of the end cross member, a terminal cross member connecting the ends of the downward struts, and brace members angularly disposed between the ends of the terminal cross member and the beams.

In accordance with another preferred embodiment hooking means are provided to attach the bucket to the bucket supporting frame.

The beams preferably consist of a foam filled core, which is surrounded by a wrap around of insulating material. The cross members may essentially consist of the end cross members.

The hooking means preferably consist of hooks provided on the bucket; the hooks being adaptable to the end cross member.

The support means may be mounted through oppositely disposed door openings of the helicopter, and may be fixed against the floor thereof by any known means.

The bucket may consist of a conductor cart, or the like, well known in the art, which would be suitable to enable a worker to work therein on the high voltage line. It may also comprise adjustable wheels which are positioned to ride on the high voltage line conductors and to support the cart or the like.

BRIEF DESCRIPTION OF DRAWINGS

The above and other features of the present invention will appear from the description which follows of an embodiment given by way of illustration only and without limitation, in which FIG. 1 is a front view of a system according to the invention as mounted on a helicopter illustrated in dotted lines;

FIG. 2 is a perspective view thereof taken on one side of the helicopter;

FIG. 3 is a side view showing a conductive cart being hooked onto the elongated support according to the invention;

FIG. 4 is a top view of the same design; and

FIG. 5 is a cross-section take along line 5—5 of FIG. 1.

DESCRIPTION OF PREFERRED EMBODIMENT

Referring to the drawings, it will be seen that the system according to the invention includes an elongated support 1, which as shown in FIGS. 1, 2 and 4 is intended to be mounted through oppositely disposed openings 3 and 5 of a helicopter 7. Also as shown, support 1 extends from the sides of the body of the helicopter.

Turning now to the main part of the system which consists of elongated support 1, in the illustrated embodiment, the latter will be seen to be made of three elongated beams 9, 11 and 13 which are parallel to one another and are fixed together at their ends through end cross members 15 and 17. One practical way of fixing the end cross members 15, 17 to beams 9, 11, 13 is to make them unitary by any known means, as shown. Of course, any other means well known to those skilled in the art of mounting these elements of the support are within the scope and spirit of the invention. Although only end cross members have been shown herein, it may be preferable to provide additional cross members for more rigidity. However, in practice, it was found that end cross members 15 and 17 are more than sufficient.

As illustrated in FIGS. 1 and 2, the support is completed by a bucket supporting frame 19, 21 at both ends of the support. Both bucket supporting frames are similar, and it will be sufficient to describe supporting frame 19. Bucket supporting frame 19 consists of a pair of downward struts 23, 25 which are fixed in known manner at the junctions between beams 9 and 13 and end cross member 17. These downward struts are essentially perpendicular to the beams and their lower ends are connected together in known manner by means of a terminal cross member 27. Finally, the bucket supporting frame includes three brace members 29, 31 and 33 also made of the same material as the remainder of the elongated support 1. Of course, only two or more than three brace members may be used. As shown in FIGS. 1, 2 and 3, brace members 29, 31 and 33 are angularly disposed between the ends and the middle part of the terminal cross member and intermediate points along beams 9, 11, 13. It will be noted that the other end of support 1 is similar, although it may be arranged to have only one bucket supporting frame to be used in connection with one bucket only. For example, the other end of the support may be provided with a counterweight to offset the weight of the bucket.

As indicated above, the support is arranged to rest on the floor of the helicopter 7 where it is fixed by any known means which is not part of the present invention. As mentioned previously it is merely sufficient that the support projects from at least one side of the body of the helicopter, although in practice it is best to have it extend on both sides.

Referring again to the drawings, it will be seen that, in the embodiment which is illustrated, two buckets 35 and 37 are provided, it being understood that one only might be necessary as long as a proper counterweight effect is provided to ensure a good balance of the helicopter.

Each bucket is in the form of a prismatic rectangular rack having four upstanding rod members 39, 41, 43 and 45, connected together at the top by means of an upper rectangular frame 47 and at the bottom by means of a lower rectangular frame (only partly shown) 49, which is similar to upper frame 47. A bottom floor (not shown) is also provided as well as protective grid 51. The bucket is completed by a pair of hooks 53, 55 which are engageable over end cross member 15, and four adjustable idle wheels 57 which are attached to bucket 35 by means of flip over brackets 59. It will be noted that only two wheels and brackets have been shown in FIG. 3 while none have been shown in FIGS. 1, 2 and 4 for the sake of commodity. The wheels are shaped and spaced therebetween to ride over parallel running high voltage line conductors 60, 60a.

As shown in FIG. 5, it is essential that beams 1 be of electrically insulated material. For example in the illustrated embodiment, the rod members are all made of a foam filled core 61, which is surrounded by a reinforcing wrap around member 63 of synthetic materials such as reinforced glass fibers.

To operate the system according to the invention, the equipment, material and/or a worker are loaded into bucket 35 or 37. The bucket is then hooked at the end of support 1 by means of hooks 53, 55 and end cross member 15 and is transported at a location of a high voltage line or installations where an operation such as a repair has to be performed. Work may then be carried out while the bucket is close to the high voltage line. However, it is much preferable to mount the bucket on the line conductors by means of the idle wheels 57 and to thereafter disengage the bucket from the support, which enables the helicopter to move away to accomplish other tasks while the worker performs necessary operations.

When the operation is terminated, the helicopter is brought back to the vicinity of the bucket which is hooked at the end of support 1 to be thereafter disengaged from the high voltage line conductors or installations and moved away. Similarly the bucket may be used to transport material only and be hooked on the conductors or installations.

We claim:

1. A system for carrying equipment, material and a worker, and placing them on a high voltage line or installations by means of a helicopter, to effect operations thereon, said system comprising:
    elongated support means made of electrically insulating material, said elongated support means extending from both sides and away from the body of said helicopter, along a horizontal transverse axis thereof,
    at least one bucket for said equipment, material and worker, said bucket having hooking means formed on one side thereof for connection with said support means,
    engaging means provided at the ends of said support means for removably attaching said at least one bucket on said one side thereof at least at one end of said support means, by connection of said engaging means with said hooking means, and,
    means enabling said bucket to be maintained in substantially vertical position while attached at said one end of said support means, and aligned with said horizontal axis so as to enable said bucket to be in vision line of a helicopter pilot, when said bucket is in vicinity of or fixed at one end of said support means.

2. A system according to claim 1, wherein said support means consists of a plurality of elongated beams, fixed together by means of a plurality of cross members.

3. A system according to claim 2, wherein said elongated beams and cross members are made of synthetic material such as reinforced glass fibers.

4. A system according to claim 3, which comprises a bucket supporting frame substantially perpendicularly mounted at said at least one end of said support means.

5. A system according to claim 4, wherein said bucket supporting frame comprises an end cross member fixedly mounted at the outer ends of said beams, downward struts perpendicularly disposed at the ends of said end cross member, a terminal cross member connecting the ends of said downward struts, and brace members angularly disposed between the ends of said terminal cross member and the beams.

6. A system according to claim 5, wherein each said beams consists of a foam filled core, which is surrounded by a wrap around reinforcing layer of insulating material.

7. A system according to claim 5, wherein said cross members essentially consist of said end cross rod members.

8. A system according to claim 5, which comprises hooking means to attach said bucket to the bucket supporting frame.

9. A system according to claim 6, wherein said hooking means consist of hooks provided on said bucket, said hooks adaptable to said end cross member.

10. A system according to claim 9, wherein said support means is mounted through oppositely disposed door openings of said helicopter.

11. A system according to claim 10, which comprises means for fixing said support means against the floor of said helicopter.

12. A system according to claim 11, wherein said bucket consists of a container for transporting material.

13. A system according to claim 11, wherein said bucket consists of a conductor cart.

14. A system according to claim 12, which comprises adjustable pulley wheels associated with said cart, said wheels positioned to ride on high voltage line conductors and to support said cart.

15. Method for carrying equipment, material and a worker to a high voltage line or installations which comprises mounting elongated support means made of electrically insulating material on a helicopter, with said elongated support means extending from both sides and away from the body along a transverse axis thereof, of said helicopter, removably attaching at least one bucket for said equipment, material and worker, at least at one end of said support means, maintaining said bucket in substantially vertical position while attached at said one end of said support means, and carrying said bucket in the vicinity of said high voltage line or installations.

* * * * *